US009600239B2

(12) United States Patent
Peeters et al.

(10) Patent No.: US 9,600,239 B2
(45) Date of Patent: Mar. 21, 2017

(54) CRYPTOGRAPHIC ACCELERATOR

(71) Applicant: Texas Instruments Incorporated, Dallas, TX (US)

(72) Inventors: Eric Thierry Peeters, Frisco, TX (US); Hamza Fraz, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 410 days.

(21) Appl. No.: 14/455,261

(22) Filed: Aug. 8, 2014

(65) Prior Publication Data

US 2016/0350077 A1 Dec. 1, 2016

(51) Int. Cl.
*G06F 7/72* (2006.01)
*G06F 21/72* (2013.01)

(52) U.S. Cl.
CPC .............. *G06F 7/723* (2013.01); *G06F 7/728* (2013.01); *G06F 21/72* (2013.01)

(58) Field of Classification Search
CPC .. G06F 7/723; G06F 7/728; G06F 2207/5523; G06F 2207/7252; G06F 7/52; G06F 7/552; G06F 7/72; G06F 7/722; G06F 9/30145; G06F 9/30167; G06F 9/30192; G06F 9/3885; G06F 9/3897; H04L 9/302
USPC ....... 713/155, 165, 189; 380/28–30
See application file for complete search history.

(56) References Cited

U.S. PATENT DOCUMENTS

| | | | | |
|---|---|---|---|---|
| 7,174,015 | B1 * | 2/2007 | Koc | G06F 7/728 380/28 |
| 7,987,356 | B2 * | 7/2011 | Buer | G06F 21/606 713/155 |
| 2005/0149595 | A1 * | 7/2005 | Fischer | G06F 7/722 708/492 |
| 2005/0149597 | A1 * | 7/2005 | Fischer | G06F 7/535 708/650 |

OTHER PUBLICATIONS

Hachez, G. et al.; "Montgomery Exponentiation with no Final Subtractions: Improved Results"; Université Catholique de Louvain, UCL Crypto Group; Louvain-la-Neuve, Belgium; http://citeseerx.ist.psu.edu/viewdoc/download?doi=10.1.1.32.3181&rep=rep1&type=pdf; 9 pages, as published in Lecture Notes in Computer Science, Ç,.K. Koç, and C. Paar, eds., vol. 1965, pp. 293-301, 2000.

* cited by examiner

*Primary Examiner* — Joseph P Hirl
*Assistant Examiner* — Sayed Beheshti Shirazi
(74) *Attorney, Agent, or Firm* — John R. Pessetto; Charles A. Brill; Frank D. Cimino

(57) ABSTRACT

A cryptographic accelerator performs various modular arithmetic operations producing unreduced results bounded by the double of the modulus (i.e.: 2*M). In doing so, various processing elements of an ALU of the cryptographic accelerator can begin to process respective data word portions of a modular arithmetic operations before the entirety of one or more operands are loaded. Similarly, various processing elements may begin to store their respective data word portions of a modular arithmetic result before the entirety of the result is calculated.

13 Claims, 1 Drawing Sheet

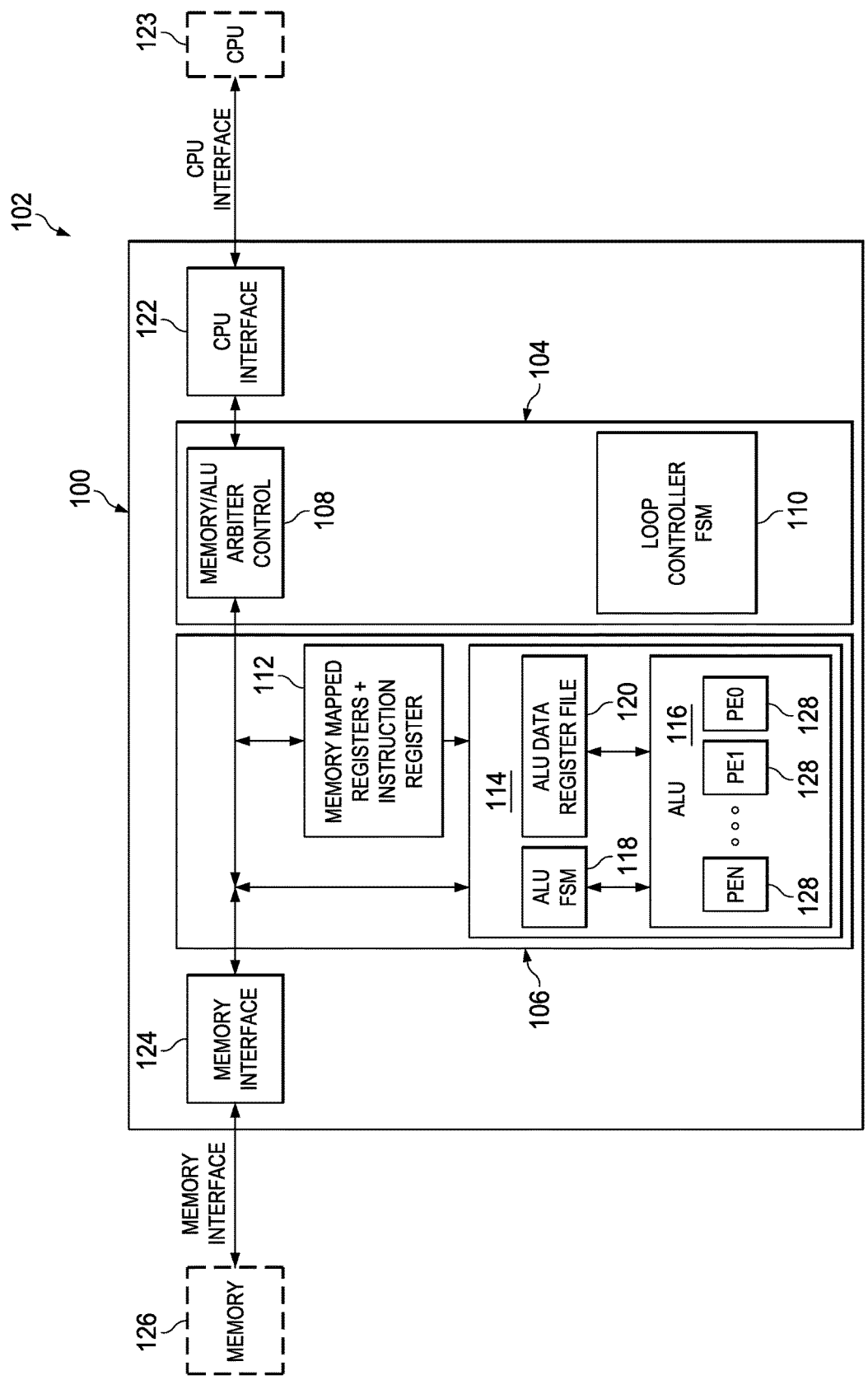

CRYPTOGRAPHIC ACCELERATOR

TECHNICAL FIELD

This invention relates generally to cryptographic accelerators.

BACKGROUND

Cryptographic accelerators are generally understood as a form of co-processor that performs encryption and decryption of data. This offloads the main processor from the burden of performing the computationally intensive operations involved in encryption and decryption.

The two primary forms of modern cryptography are symmetric-key encryption and public-key encryption. Symmetric-key encryption is a method in which both the sender (encrypter) and the receiver (decrypter) share the same key. Conversely, public-key encryption (or asymmetric key encryption) involves the use of two keys: a widely distributed public key for encryption and a secret private key for decryption. The private and public keys are mathematically related, however, it is computationally infeasible to calculate the private key from the public key. Common public-key encryption methods include the Diffie-Hellman algorithm, the RSA algorithm, the DSA algorithm, and more recently, elliptic curve cryptography.

Common implementations of various types of public-key cryptography involve modular arithmetic operations. In particular, implementation often involves multiple modular multiplication operations, which operations are relatively complex (involving additional hardware) and slow (taking many clock cycles to compute). Accordingly, it is desirable to provide an efficient solution using hardware of reduced complexity.

SUMMARY

Generally speaking and pursuant to these various approaches, a cryptographic accelerator ("crypto accelerator") can perform a modular multiplication operation. Because this crypto accelerator is at the heart of huge loop processing the public-key operation, it is desirable to optimize it, for example, to avoid wasted time and energy. Among the possible approaches to optimize a public key accelerator, one can choose: the so-called Montgomery Modular multiplication technique that has the advantage of computing the reduction factor (for the modular operation) from right to left, which is the natural direction in which the carry propagates. Another technique would involve computing the modular multiplication without fully reducing the result. In particular, it can be proven that operands (inputs) and the result can remain bounded by the double of the modulus M (i.e., 2*M). Further, by one approach, the crypto accelerator may include a plurality of processing elements, wherein some processing elements begin to arithmetically process data-word portions of the computation before an operand (upon which the arithmetic operation is performed) is completely loaded.

So configured, the crypto accelerator operates with increased efficiency and reduced complexity. These and other benefits may become clearer upon making a thorough review and study of the following detailed description.

BRIEF DESCRIPTION OF THE DRAWINGS

FIG. 1 is a block diagram of an example apparatus including a cryptographic accelerator in accordance with various approaches.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Referring now to FIG. 1, a block diagram of a cryptographic accelerator 100 ("crypto accelerator") as may be situated within an apparatus 102. For example, the apparatus 102 may be a computer, a server, a vehicle, a portion of a processor, an ASIC, or any other electronic device that may benefit from the use of a crypto accelerator 100. By one approach, the crypto accelerator 100 includes a control module 104 and a processing module 106. The control module 104 may include a memory and Arithmetic Logic Unit ("ALU") arbiter controller 108 and a loop controller Finite-State Machine ("loop controller FSM") 110. The processing module 106 may include a set of registers 112, including possible Memory-Mapped Registers (MMR), including control registers, instruction registers, status registers, as well as address registers and data registers. The processing module 106 may also include an arithmetic processing module 114. The arithmetic processing module 114 may include an Arithmetic Logic Unit ("ALU") 116, an ALU Finite State Machine ("ALU FSM") 118, and an ALU data register file 120. The crypto accelerator 100 may include a Central Processing Unit ("CPU") interface module 122 and a memory interface module 124.

The CPU interface module 122 is configured to communicatively couple to a processor 123, such as a CPU, through one or more processor busses. For example, the CPU interface module 122 may couple to an Advanced Microcontroller Bus Architecture (AMBA), or an AMBA High-performance Bus (AHB), or an AHB-lite interface. The CPU interface module 122 may be configured to couple to other common bussing architectures using other known bussing techniques. Typically, the CPU interface module 122 will be configured to send/receive data and/or addresses to/from a processor 123, multiple processors, or other computing devices and serves as the primary interface between the crypto accelerator 100 and the other processor 123. The CPU interface module 122 may also be coupled within the crypto accelerator 100 to the control module 104, and in particular, to the memory and ALU arbiter controller 108, which controls various processes of the processing module 106 and arbitrates control and access to the various registers and processes of the processing module 106. For example, the arbiter controller 108 may receive commands, interrupts, and/or data from the CPU interface 122, which can trigger various responses. The arbiter controller 108 may utilize the loop controller FSM 110 to assist in its control and arbitration functions and to help control the data flow through the ALU 116.

The control module 104, and in particular the arbiter controller 108, may in turn be coupled to the processing module 106. Data, control, and/or address lines may provide communication (possibly two-way) between the control module 104 and the set of registers 112 and the arithmetic processing module 114. Further, these data, control, and/or address lines may also couple the memory interface module 124 to the processing module 106 and the control module 104. The memory interface 124 can provide access to a memory 126 (for example, RAM, SRAM, DRAM, or other memory types). This memory 126 may be a separate memory module or a portion of a larger system memory, but at least a portion of the memory is typically reserved specifically for use by the crypto accelerator 100. The disclosed system may utilize an approximately 1 KB block of memory to enable loading and storing of operands, results, and other required data and values. By one approach, the block of memory may be separated into 32-bit (4-byte) portions, to which various values and designators are assigned (possibly by the CPU 123). For example, the memory block may include 16 operands R0-R15, which starting addresses can be set by the CPU 123, as well as space for the encryption key or other required values.

Either or both of the memory 126 and the crypto accelerator 100 can serve as slave devices to the master CPU 123. In one form, the crypto accelerator set of registers 112 is available to the CPU 123 for read at all times, but possibly not available to the CPU 123 for write while the crypto accelerator 100 is processing an instruction. Similarly, the memory 126 may not be available to the CPU 123 while in use by the crypto accelerator 100.

Typically, the CPU interface module 122 and the memory interface module 124 are 32-bit interfaces, with the entire crypto accelerator 100 being configured to operate using a 32-bit architecture. Accordingly, the external and internal busses, modules, and elements are configured to accommodate 32-bit data words. Such a 32-bit architecture is assumed throughout this disclosure, though the teachings described herein are easily scalable to other architecture sizes, including 8-bit, 16-bit, 64-bit, or 128-bit architectures, or architectures of other sizes, and the 32-bit architecture is to be understood as but one example architecture size.

The processing module 106, and more specifically the ALU 116, performs the actual arithmetic operations to encrypt and decrypt data. As will be explained in more detail below, the ALU 116 can perform a set of arithmetic operations on incoming data, which operations, when performed in particular orders, act to encrypt or decrypt the data.

So configured, the crypto accelerator 100 may function as a pipeline to encrypt and/or decrypt data. As the encryption/decryption operations are processor intensive, offloading a main processor or CPU of these functions can greatly improve speed of the system as a whole. This can be beneficial to many different system that utilize encryption/decryption, including computing devices, mobile devices, automobiles, communication devices (such as cell towers, relays, satellites, etc.), and any other electronic device that may currently utilize or otherwise benefit from such protection.

As is readily understood in the art, public-key encryption and decryption involves the use of a public and private key pair, which key pairs are mathematically related. However, it is computationally infeasible to determine the private key from knowledge of the public key. Typically, at least with RSA cryptography, the public key includes a cryptographic modulus M and a public encryption exponent e. The mathematically-related private decryption exponent d is retained by the receiver to enable private decryption. Any interception of an encrypted message using the public key cannot be decrypted without knowledge of the private decryption exponent d. Most commonly, the public encryption exponent e is 17 bits long, but can be any bit-length.

The cryptographic modulus M has a set bit length, which is known as the key length. Typical RSA key lengths may include 1024, 2048, 3072, and 4096 bits (corresponding to 32, 64, 96, and 128 32-bit words, respectively), though many other key lengths are possible. For ECC, typically key lengths include 160, 192, 224, 256, 384, and 512 bits (corresponding to 5, 6, 7, 8, 12, and 16 blocks of 32-bit words, respectively), though many other key lengths are possible. One benefit of using the known Elliptic Curve Cryptography ("ECC") approach is having a smaller key size with similar security to that of RSA or other encryption schemes. For example, an ECC key length of 256 bits may provide comparable security to an RSA key length of 3072 bits. The crypto accelerator 100 described herein will be described with reference to ECC key lengths and ECC compatibility, however, it should be understood that the teachings disclosed herein are compatible with many cryptography techniques and are not limited to ECC (or RSA).

Most modern implementations of encryption and decryption involve modular arithmetic, particularly modular addition, modular subtraction, modular multiplication, and modular exponentiation, amongst others. Modular multiplication is processor intensive and can take many clock cycles to complete. Classical modular multiplication involves first multiplying the two operands, and then taking the modulo of the result. However, the intermediate result (of the multiplication) can become very large, making such calculations practically infeasible, particularly with modular exponentiation of large numbers as is common in cryptography. To solve this issue, Montgomery multiplication (or Montgomery reduction) is widely implemented in cryptography, and can be executed as a series of Montgomery multiplication steps for use with modular exponentiation.

It has been determined that the solution S of a Montgomery multiplication (which may be an intermediate solution as part of a larger Montgomery exponentiation) will not exceed twice the cryptographic modulus M (i.e., $S<2*M$). This holds true as long as the cryptographic modulus has the relationship $M \geq 2^t$ (where t is the block size, being 32-bits in this example). Such a constraint will almost universally hold true given typical key sizes of at least 128 or 160 bits long (implying that as long as a single bit of any data word portion of the modulus beyond the least-significant word is 1, this condition is satisfied). This topic has been discussed in the paper by Gael Hachez and Jean-Jacques Quisquater titled *Montgomery Exponentiation with No Final Subtractions: Improved Results*, published in 2000, the contents of which is incorporated herein by reference (as published in *Lecture Notes in Computer Science*, Ç ,. K. Koç, and C. Paar, eds., vol. 1965, pp. 293-301, 2000). With this assumption, a configuration using an unreduced modulus of twice the cryptographic modulus M (i.e., 2*M) can improve overall performance of the system because the final reduction after each Montgomery modular multiplication is not needed and the associated hardware to perform this operation is not needed. This comes, however, at the cost of storing intermediate results that are potentially 1 bit longer.

This may result in higher memory usage if these values are stored in Random Access Memory, for instance.

With continued reference to FIG. 1, the ALU 116 contains a plurality of processing elements 128. Each processing element 128 is configured to perform arithmetic operations on one-data-word-long portions of an overall arithmetic operation. For example, each processing element may be configured to perform separate 32-bit portions of an arithmetic operation on a longer overall arithmetic operation (for example, an overall arithmetic operation involving 160, 192, 224, or 256 bits). Processing element PE0 is configured to perform arithmetic operations on the least-significant word portions of one or two incoming operands, processing element PE1 is configured to perform arithmetic operations on the second-least-significant word portions of the incoming operand(s), and so forth. Processing element PEN is configured to perform arithmetic operations on the most-significant word portions of the incoming operands. Each processing element 128 is configured to perform the arithmetic operation on at least one of or both incoming operands (for example, A and B) and output the data-word portion of the result. Each processing element 128 (possibly except for PEN) is also configured to send carry-bits to the next processing element 128 (for example, processing element PE0 can send carry-bits to PE1, and so forth). Similarly, all processing elements 128 (possibly except for PE0) are configured to receive carry-bits from the preceding processing element (for example, processing element PE1 can receive carry-bits from PE0, and so forth).

To account for potential carry bit(s) involved with an unreduced result modulo M (<2*M), the last processing element PEN may be configured to provide its portion of the result including any carry-bit. The crypto accelerator 100 may be configurable to process operands and keys of varying lengths (for example, length N+1, corresponding to the number of data word blocks in the operand: 5 blocks for 160 bits, 6 blocks for 192 bits, and so forth). Such a configuration may be set in a control or configuration register (for example, as part of registers 112). Accordingly, by one approach, the last processing element PEN may merely represent the most-significant bit portion of a certain operand length (the length being N+1). For example, processing element PEN may actually be PE4 for 160 bit length (PE4 being the 5th processing element for the data-word length N+1=5), PE5 for 192 bit length (being the 6th processing element for the data-word length N+1=6), and so forth. The ALU 116 may be configurable to determine which processing element 128 actually functions as the PEN based on the cryptographic scheme being used or other factors. Alternatively, processing element PEN may be a dedicated most-significant word processing element, wherein the ALU 116 may then be configured to send any carry-bits from the second-most-significant word processing element (i.e., PEN−1) to the dedicated most-significant word processing element PEN. Either way, processing element PEN can be configured to output its portion of the result with carry bits. This means that even though PEN processes, for example, 32-bit word portions, PEN may output a two-word output, being two 32-bit words. Alternatively, the ALU 116 or the crypto accelerator 100 may contain other logic to convert carry-bit from processing element PEN to the additional data word. By this, an unreduced result of an arithmetic operation having length N+1 (corresponding to the extra data-word) involving the unreduced result moduloM (<2*M) can be stored into memory and/or made available for a next arithmetic operation.

Because the ALU 116 is not reducing fully the result modulo M (but rather guarantees that the result is bounded to 2*M if the inputs are bounded to 2*M), it is no longer burdened with checking a result to see if the result exceeded the cryptographic modulus M after or during a modular multiplication operation (for example, a Montgomery multiplication operation). This allows for at least the following beneficial results. First, in one approach, a checking step (to see if the result exceeded the cryptographic modulus M) and a subsequent reduction by modulo M (when appropriate) can be skipped, making the operation of the ALU 116 more efficient. Second, in another approach, because the ALU 116 does not need to wait until all processing elements 128 have finished the modular multiplication step to see if the result exceeded the cryptographic modulus M, the crypto accelerator 100 can store a data-word portion of the result into memory 126 as soon as the corresponding processing element 128 has finished computing the result. For example, during a modular multiplication operation, as soon as processing element PE0 (least significant word) has calculated its result (which will be the first processing element 126 to do so), that data-word portion of the result can be stored into memory without waiting for the entire set of processing element 126 to finish the operation to determine if an additional modular reduction is necessary. This is particularly beneficial as typically only one data-word can be communicated out to the memory 126 for storage at a time. By this, the storage phase can overlap with the processing phase (rather than the two phases operating serially), thus creating additional efficiency.

By an additional approach, a similar overlap can be achieved between loading operands and processing an operation. If an operation requires an operand to be loaded from memory, a processing element 128 can begin to process its portion of the operation upon receipt of any and all data word portions of any and all operands the processing element 128 is to process rather than waiting for the entirety of all operands to load. By this, a less-significant processing element 128 (for example, PE0) can begin to process its portion of the operation before a next-significant processing element 128 (for example, PE1) begins to process its portion (because that next-significant word portion has not yet or is currently being loaded). For example, a first operand may be loaded from memory (or, for example, it may already be loaded from a previous operation), and then a second operand may begin to be loaded from memory. Because data typically is loaded from memory one data-word at a time, as soon as the least-significant portion of the second operand is loaded from memory, processing element PE0 may begin to process this portion. In the next cycle, after the next-significant data-word portion is loaded, processing element PE1 may begin to process this portion, and so forth up the line until PEN begins to process the most-significant portion immediately after that portion is loaded. In such an approach, it may be beneficial for operands to be stored in memory in little-endian fashion (that is, with the least-significant word portion of an operand stored at a lower memory address than the next-significant word portion). By overlapping the loading of operands and processing of portions of the operands, timing efficiency can be realized.

The timing benefits are explained further by way of a non-limiting example. Typically, a prior, known system will first load the entirety of a first operand from memory, then load the entirety of a second operand from memory. Once both operands are loaded, the typical system will process the operation, and upon completion of processing, store the result into the memory. Given a 256-bit system (8 data words), an ADD operation may take the following amount of cycles: load first operand=9 (1 for address phase, 8 for data transfer phase); load second operand=9; process=11; store result=9. This yields a total of 38 cycles. However, by overlapping processing and loading, an ADD operation may be as follows: load first operand=9; load second operand=2 (1 address phase, 1 for data transfer phase of least-significant word); process=11; store result=9. As can be seen here, much of the loading of the second operand overlaps with the processing and is counted only once (as processing rather than loading in this example). This yields a total of 31 cycles, for a savings of seven cycles.

By another example, when using an unreduced result modulo M, the crypto accelerator 100 can begin to store the result to memory 126 upon completion of processing of each data-word portion. Thus, for example, as soon as the processing element PE0 for the least-significant word portion has completed processing its portion of the result, that portion can be stored into memory 126 before processing element PE1 for the next-significant word portion has completed processing its portion of the result. This may result in, for example, another seven cycles of overlap between processing and storage. Thus, continuing with the above example, an ADD operation may be as follows: load first operand=9; load second operand=2 (1 address phase, 1 for data transfer phase of least significant word); process=11; store result=2 (storage of the most-significant word portion and the additional carry-bit word portion). As can be seen here, much of the storage of the result overlaps with the processing and is counted only once (as processing rather than storage in this example). This yields a total of 24 cycles, for a total savings of 14 cycles. These same or similar benefits can be realized while performing other arithmetic operations. Although the STORE process does not necessarily overlap with EXECUTION for all ADD and SUB operations, it only does for all MUL operations. For ADD and SUB, the execution finishes, and the result is reduced MOD 2M before STORE commences. For all instructions, however, the RESULT can be stored in a local register (1 cycle operation) instead of writing it back to the memory and used in the subsequent instruction to minimize the number of load cycles for that subsequent instruction.

In operation, the crypto accelerator 100 is equipped with new instructions allowing it to perform modular arithmetic operations with the unreduced modulus 2*M. An example set of instructions is provided below in Table 1.

TABLE 1

| Name | Opcode | Description |
|---|---|---|
| NOP | 0x0 | No OP |
| REDM | 0x1 | DEST = SRC1 MOD M |
| ADD | 0x2 | DEST = SRC1 + SRC2 |
| ADD2M | 0x3 | DEST = (SRC1 + SRC2) MOD 2M |
| SUBa | 0x4 | DEST = (SRC 1 − SRC2) |
| SUBa2M | 0x5 | DEST = (SRC1 − SRC2) MOD 2M |
| ADDC | 0x6 | DEST = SRC1 + SRC2 + previous Carry |
| SUBC | 0x7 | DEST = (SRC1 − SRC2 − previous borrow) |
| MUL | 0x8 | DEST = SRC1 * SRC2 |
| MUL2M | 0x9 | DEST = (SRC1 * SRC2) MOD 2M or DEST = S + (SRC1 * SRC2) MOD 2M |
| CMP | 0xA | Check SRC1 == SRC2 with Zero flag |
| MULP2 | 0xD | ECC Special Instruction |
| EXP | 0xE | Modular Exponentiation Instruction |
| MULP | 0xF | ECC Special Instruction |

Because the modular multiplication operation is available with for use with the modulus M (e.g., operations "MUL2M", the ECC operation MULP2, . . . ), other modular arithmetic operations can also be performed with the modulus M (e.g., "ADD2M" and "SUBa2M"). Accordingly, entire strings of modular arithmetic operations can be performed with the modulus M without a need for complete reduction to the cryptographic modulus M. The result is always guaranteed to be smaller than 2*M. When needed (for example, before final storage or output), a reduction to the cryptographic modulus M can be performed with the instruction "REDM." Accordingly, a string of modular multiplication operations (possibly during a modular exponentiation) and other modular arithmetic operations can be performed without full reduction to the cryptographic modulus M, thus eliminating the time needed for multiple intermediate reduction operations and instead performing a single reduction at the end. It is also noted that the ALU 116 can perform regular operations as well (e.g., "ADD", "SUBa", and "MUL"), although these would not necessarily be fully reduced operations. Instead, such operations are non-modulo, unreduced operations like normal addition, subtraction, and multiplication.

With continued reference to FIG. 1, other aspects are described. In one approach, the set of registers 112 can include a set of pointer registers that are configured to save (or point to) locations in memory 126 where various data is stored. For example, the locations in memory may correspond to a plurality of operands that may be input into (or output out of) arithmetic operations performed by the ALU 116. By one approach, there are 16 pointer registers configured to point to 16 potential operand memory locations, though another number or variable number of pointer registers are possible. Other required or significant data may have pointer registers as well, including, for example, the cryptographic modulus M, a Mu value (required for Montgomery multiplication operations. It corresponds to the inverse modulo R of the modulus. Where R is 2^(size of word) in our case (i.e., 2^32). In other words: Mu=−1/M mod R), and a start bit position register (required for various special instructions used in ECC), as well as other pointer registers. In such an approach, the memory location to which the pointer registers point can simply be updated with a location of an operand within the memory 126 rather than actually moving the data to a different preset location or register. It can be very time consuming and power inefficient to actually move data from one memory location to another. Additionally, moving a data from one memory location to another result in a power profile that can be used by hacker to retrieve the data and correlate them to the key (E.g. SPA, DPA attacks). Comparatively, updating a pointer register with a new location of an item of data can be performed much quicker. By this, additional time and power savings can be realized by the crypto accelerator 100 during performance of an encryption or decryption operation.

In another form, the crypto accelerator 100 minimizes time-intensive read and write operations to and from the memory 126. Particularly, if a result of an arithmetic operation is needed for a next arithmetic operation, the result can be stored into a local register, such as the data register file 120 of the arithmetic processing module 114 for use in the next (or a subsequent operation, even if not the immediate next operation). This can be done instead of storing the result into memory 126 only to be read back again at a later time. By another approach, if an operand is to be reused in the next or a different subsequent operation (for example, during a square or other exponentiation operation), the operand can be loaded a single time and then reused for the next or other subsequent operations. By reusing the operand, additional read operations can be avoided, thus reducing the time required to ultimately perform the operation.

In certain approaches, the set of registers 112 may include a control register, a portion of which may be configured to specify the operand size (typically relating to the modulus size or the key size). For example, the operand size portion of the control register may be 2 or 3 bits long, with certain values specifying certain lengths (e.g., 0x0=160 bits, 0x1=192 bits, 0x2=224 bits, 0x3=256 bits, and so forth). The set of registers 112 may also include a status register that can be set by an external device (such as the CPU 123) or set by the crypto accelerator 100. For example, the status register may include a carry flag that is set by the accelerator 100 when the ALU 116 has a result with a carry, a negative flag that is set by the accelerator 100 when the ALU 116 has an negative result, and a zero flag that is set by the accelerator 100 when the ALU 116 has an zero result (e.g., during a compare operation when a first operand and a second operand are equal). The set of registers 112 may also include various interrupt status and clear registers to be set by the accelerator 100 or the CPU 123.

Additionally, the set of registers 112 may also include various instruction registers to be set or cleared (for example, by the crypto accelerator 100 or the CPU 123) depending upon the desired operation, feature, or optimization. The instruction registers may include a portion to set the desired operation (perhaps by using an OPCODE as shown in the example TABLE 1 above). Also, a portion to set a Hardcode for special ECC instructions may be included in the set of registers 112. Portions may be included to select one or more operands for an operation. For example, a first and second operand selection instruction register may each include bits that correspond to operand pointer registers, which in turn point to addresses in memory as discussed above. For example, a first operand selection instruction register may include 4 bits, which allows for addressing of up to 16 different operand pointer registers (e.g., 0x0 may select operand pointer register R0, 0x1 may select operand pointer register R1, and so forth). Similarly, a result destination selection instruction register can be set to indicate an operand register in which to store a result of an operation.

In an example, the first operand selection register can be set to 0x0, corresponding to operand register R0, and the second operand selection register can be set to 0x1, corresponding to operand register R1. The crypto accelerator 100 may then load from memory 126 the first and second operands located at the memory addresses stored in registers R0 and R1, respectively. A result destination selection instruction register may be 0x2, corresponding to operand register R2 such that the result of the operation can be stored into memory 126 at the memory address stored in register R2. In another example, the instruction register may include a portion to indicate whether to store a result into memory or into a local datapath register Y. Similarly, the instruction register may include a portion to indicate whether to load an operand (for example, the first and/or the second operand) from memory or from local datapath register Y.

Similarly still, the instruction register may include a portion to indicate whether to load an operand of an operation (for example, the first and/or second operand) from memory or from a local accumulator register S. Possibly, this same instruction register portion may indicate whether to reset the local accumulator register S before a MUL or MUL2M operation when such an operation is specified elsewhere in the instruction register (for example, in the OPCODE portion). This allows the crypto accelerator 100 to perform either a multiply or a multiply-and-accumulate operation. This instruction register portion may also indicate if a first operand comes from memory (during a multiplication where the first and second operands are distinct) or comes from local datapath register Y (during a multiplication where the first and second operands are the same, as in during a "square" operation).

What has been described herein is, in one form, a crypto accelerator 100 including an ALU 116 configured to perform at least one modular multiplication operation involving at least a first operand and a second operand, each divisible into a series of separate data words portions, wherein the cryptographic modulus is M. The crypto accelerator 100 may be configured to load the first operand by individually loading a series of data word portions of the first operand and to load the second operand by individually loading a series of data word portions of the second operand, and to perform the modular multiplication operation with modulus M to generate an unreduced modular multiplication result including at most one additional carry bit to account for the unreduced result <2*M. The crypto accelerator 100 may be also configured to either or both of store the unreduced modular multiplication result into the memory 126 without fully reducing the unreduced modular multiplication result to cryptographic modulus M, or perform a next (or subsequent) modular arithmetic operation involving the unreduced modular multiplication result without fully reducing the unreduced modular multiplication result to cryptographic modulus M. In this form, the ALU 116 may include a plurality of processing elements 128 configured to perform the modular multiplication operation, each being configured to arithmetically process a data word portion of the modular multiplication operation using the modulus M involving a corresponding data word portion of the first operand and a corresponding data word portion of the second operand to generate a corresponding data word portion of the unreduced modular multiplication result. Various ones of the plurality of processing elements 128 may be configured to begin to arithmetically process their respective data word portion of the modular multiplication operation before the crypto accelerator loads the entirety of the series of data word portions of an operand (such as the first or the second operand); and/or begin to store their respective data word portion of the modular multiplication result before individual others of the plurality of processing elements completed arithmetically processing their respective data word portion of the modular multiplication operation.

In some forms, the crypto accelerator 100 may also be configured to perform a next (or subsequent) modular arithmetic operation involving the unreduced modular multiplication result without storing the unreduced modular multiplication result into memory 126. In other forms, the crypto accelerator 100 further comprises at least one accumulation register (possibly within the set of registers 112) and is also configured to store the unreduced modular multiplication result in the accumulation register. By this, the crypto accelerator 100 can perform the next modular arithmetic operation involving the unreduced modular multiplication result by using the contents of the accumulation register as the first and/or second operands. In an example involving a modular exponentiation operation, the crypto accelerator 100 can reuse an operand located in the other of the first and second operands without reloading that operand. By some approaches, the crypto accelerator 100 is configured to reduce an unreduced modular multiplication result to modulus M (i.e., the fully reduced modulus M) to generate a fully reduced modular multiplication result (possible using a REDM instruction). In addition to modular multiplication, the crypto accelerator 100 may be configured to perform other modular arithmetic operations using the modulus M, including an unreduced modular addition operation and an unreduced modular subtraction operation. In performing various modular arithmetic operations, the crypto accelerator 100 may utilize an additional data word to account for one or more additional carry bits of an unreduced modular operation.

By some approaches, the crypto accelerator 100 includes a plurality of pointer registers (possibly within the set or registers 112) that are configured to point to a plurality of memory addresses corresponding to a plurality of operands. In such an approach, the crypto accelerator 100 can be configured to perform a virtual data move of new operand data into one of the operands by updating one of the pointer registers with a new memory address corresponding to the new data.

A corresponding method is also disclosed in accordance with various approaches, which method may be performed entirely or in part by the crypto accelerator 100. The method may include individually loading a series of data word portions of at least one operand and performing a modular multiplication operation by a plurality of processing elements of an ALU 116 of the crypto accelerator 100. The modular multiplication operation involves the operand(s) and a cryptographic modulus M. The modular multiplication operation is performed with a modulus M to generate an unreduced modular multiplication result. This result may include an additional carry bit to account for the unreduced result modulo M (<2*M). At least one of the processing elements begins to arithmetically process its respective data word portion of the modular multiplication operation before the crypto accelerator loads the entirety of the series of data word portions of the operand(s). The method may include performing future modular arithmetic operations involving the unreduced modular multiplication result without fully reducing the unreduced modular multiplication result to the cryptographic modulus M.

By some approaches, the method also includes storing the unreduced modular multiplication result into an accumulation register and performing a next modular arithmetic operation using the unreduced modular multiplication result stored in the accumulation register as an operand. This may possibly further include reusing a second operand used in the modular multiplication operation without reloading the second operand from a memory (which may occur when the modular multiplication operation is a portion of a modular exponentiation operation). The method may include reducing a result of the future modular arithmetic operation to the cryptographic modulus M to generate a fully reduced modular arithmetic result.

In other approaches, the method includes performing another modular arithmetic operation using the modulus M, possibly including an unreduced modular addition or an unreduced modular subtraction. Also contemplated is maintaining a plurality of pointer registers configured to point to a plurality of memory addresses corresponding to a plurality of operands; and performing a virtual data move of new operand data into one of the operands by updating at least one of the pointer registers with a new memory address corresponding to the new data.

So configured, a crypto accelerator 100 is provided that utilizes a modulus M with the unreduced result mechanism. This in turn reduces the number of cycles required to perform various modular arithmetic operations, resulting in a crypto accelerator 100 with increased efficiency and reduced complexity.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus comprising:
one or more hardware processors, the one or more hardware processors comprising:
a crypto accelerator comprising:
an arithmetic logic unit (ALU) configured to perform at least one modular multiplication operation involving at least a first operand and a second operand wherein the cryptographic modulus is M and the first operand and the second operand are each divisible into a series of separate data words portions;
a plurality of pointer registers configured to point to a plurality of memory addresses corresponding to a plurality of operands, wherein the crypto accelerator is configured to perform a virtual data move of new operand data into one of the plurality of operands by updating at least one of the plurality of pointer registers with a new memory address corresponding to the new data;
wherein the crypto accelerator is further configured to:
load the first operand, wherein loading the first operand comprises individually loading a series of data word portions of the first operand;
load the second operand, wherein loading the second operand comprises individually loading a series of data word portions of the second operand;
perform the modular multiplication operation with modulus M to generate an unreduced modular multiplication result bounded by 2*M, wherein the unreduced modular multiplication result comprises at most one additional carry bit to account for the unreduced modular multiplication result bounded by 2*M;
wherein the crypto accelerator is further configured to at least one of:
store the unreduced modular multiplication result into a memory without fully reducing the unreduced modular multiplication result to cryptographic modulus M, and perform a next modular arithmetic operation involving the unreduced modular multiplication result without fully reducing the unreduced modular multiplication result to cryptographic modulus M;
wherein the ALU comprises a plurality of processing elements configured to perform the modular multiplication operation, individual ones of the processing elements configured to arithmetically process a data word portion of the modular multiplication operation using the modulus M involving a corresponding data word portion of the first operand and a corresponding data word portion of the second operand to generate a corresponding data word portion of the unreduced modular multiplication result;
wherein individual ones of the plurality of processing elements are configured to:
begin to arithmetically process their respective data word portion of the modular multiplication operation before the crypto accelerator loads the entirety of the series of data word portions of the second operand; and begin to store their respective data word portion of the modular multiplication result before individual others of the plurality of processing elements complete arithmetically processing their respective data word portion of the modular multiplication operation.

2. The apparatus of claim 1 wherein the crypto accelerator is further configured to perform a next modular arithmetic operation involving the unreduced modular multiplication result without storing the unreduced modular multiplication result into memory.

3. The apparatus of claim 2 wherein the crypto accelerator further comprises at least one accumulation register and wherein the crypto accelerator is further configured to:
store the unreduced modular multiplication result in the accumulation register; and
perform the next modular arithmetic operation involving the unreduced modular multiplication result by using the contents of the accumulation register as one of the first and second operands.

4. The apparatus of claim 3 wherein the at least one modular multiplication operation comprises a portion of a modular exponentiation operation and wherein the crypto accelerator is further configured to perform the next modular arithmetic operation involving the unreduced modular multiplication result by reusing the operand located in the other of the first and second operands.

5. The apparatus of claim 1 wherein the crypto accelerator is configured to reduce to modulus M at least one unreduced modular multiplication result to generate a fully reduced modular multiplication result.

6. The apparatus of claim 1 wherein the crypto accelerator is configured to perform other modular arithmetic operations using the modulus M, the other modular arithmetic operations being one or both of an unreduced modular addition and an unreduced modular subtraction, and wherein both the unreduced modular addition and the unreduced modular subtraction can be unreduced and bounded by 2*M.

7. The apparatus of claim 1 wherein the additional carry bit of the unreduced modular multiplication result comprises an additional data word to account for the unreduced modular multiplication result bounded by 2*M when the result is stored in the memory or an additional data bit for the result is stored in the memory when the result is stored in an accumulation register.

8. A method comprising:
at a crypto accelerator:
loading individually a series of data word portions of at least one operand;
performing at least one modular multiplication operation by a plurality of processing elements of an arithmetic logic unit (ALU) of the crypto accelerator, wherein the at least one modular multiplication operation involves the at least one operand and wherein a cryptographic modulus is M;
wherein performing the at least one modular multiplication operation further comprises performing the at least one modular multiplication operation with a modulus M to generate an unreduced modular multiplication result, wherein the unreduced modular multiplication result comprises at most one additional carry bit to account for the unreduced modular multiplication result bounded by 2*M;
at least one of the plurality of processing elements beginning to arithmetically process a respective data word portion of the modular multiplication operation before the crypto accelerator loads an entirety of the series of data word portions of the at least one operand; and
performing a future modular arithmetic operation involving the unreduced modular multiplication result without fully reducing the unreduced modular multiplication result to the cryptographic modulus M,
storing the unreduced modular multiplication result into an accumulation register;
maintaining a plurality of pointer registers configured to point to a plurality of memory addresses corresponding to a plurality of operands; and
performing a virtual data move of new operand data into one of the plurality of operands by updating at least one of the plurality of pointer registers with a new memory address corresponding to the new data.

9. The method of claim 8, wherein the at least one modular multiplication operation comprises a portion of a modular exponentiation operation and wherein performing a next modular arithmetic operation further comprises reusing a second operand used in the modular multiplication operation without reloading the second operand from a memory.

10. The method of claim 8 further comprising reducing to the cryptographic modulus M a result of the future modular arithmetic operation to generate a fully reduced modular arithmetic result.

11. The method of claim 8 further comprising performing at least one other modular arithmetic operation using the modulus M on the at least one of the unreduced operands, the at least one other modular arithmetic operation comprising at least one of an unreduced modular addition and an unreduced modular subtraction.

12. An apparatus comprising:
one or more hardware processors, the one or more hardware processors comprising:
a crypto accelerator comprising:
a plurality of pointer registers configured to point to a plurality of memory addresses corresponding to a plurality of possible operands;
an arithmetic logic unit (ALU) configured to perform at least one modular multiplication operation involving at least a first operand and a second operand wherein the cryptographic modulus is M and the first and second operands are each divisible into a series of separate data words portions;
the crypto accelerator being configured to:
load the second operand, wherein loading the second operand comprises individually loading a series of data word portions of the second operand; and
perform the modular multiplication operation with a modulus M to generate an unreduced modular multiplication result, wherein the unreduced modular multiplication result comprises at most one additional carry bit to account for the unreduced result bounded by 2*M;
the ALU comprising a plurality of processing elements configured to perform the modular multiplication operation, each processing element configured to arithmetically process a data word portion of the modular multiplication operation using the modulus M involving a corresponding data word portion of the first operand and a corresponding data word portion of the second operand to generate a corresponding data word portion of the unreduced modular multiplication result;

wherein individual ones of the plurality of processing elements are configured to begin to arithmetically process their respective data word portion of the modular multiplication operation before the crypto accelerator loads an entirety of the series of data word portions of the second operand; and wherein the crypto accelerator is further configured to:
 store the unreduced modular multiplication result in a local register;
 perform a next modular arithmetic operation involving the unreduced modular multiplication result stored in the local register, wherein the next modular arithmetic operation uses the modulus M and comprises one of the set consisting of a modular multiplication operation, an unreduced modular addition operation, and an unreduced modular addition operation; and
 perform a virtual data move of new operand data into one of the plurality of potential operands addressed by at least one of the plurality of pointer registers by updating the at least one of the plurality of pointer registers with a new memory address corresponding to the new data.

13. The apparatus of claim 12 wherein the crypto accelerator is further configured to perform the next modular arithmetic operation involving the unreduced modular multiplication result by reusing the second operand without loading a new second operand.

* * * * *